United States Patent
Goto et al.

(10) Patent No.: US 7,377,973 B2
(45) Date of Patent: May 27, 2008

(54) WATER-BASED INK FOR INK-JET RECORDING

(75) Inventors: Kazuma Goto, Nagoya (JP); Noriaki Satoh, Nagoya (JP); Junichiro Sugimoto, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/565,995

(22) Filed: Dec. 1, 2006

(65) Prior Publication Data

US 2007/0153072 A1 Jul. 5, 2007

(30) Foreign Application Priority Data

Dec. 15, 2005 (JP) .............................. 2005-362466

(51) Int. Cl.
*C09D 11/00* (2006.01)
*C09D 11/02* (2006.01)
*B41J 2/01* (2006.01)

(52) U.S. Cl. ................. 106/31.58; 106/31.43; 106/31.59; 106/31.75; 106/31.86; 106/31.89; 347/100

(58) Field of Classification Search ............ 106/31.58, 106/31.86, 31.43, 31.75, 31.59, 31.89; 347/100
See application file for complete search history.

(56) References Cited

U.S. PATENT DOCUMENTS

| | | | |
|---|---|---|---|
| 4,790,880 A * | 12/1988 | Miller .................... 106/31.46 |
| 4,990,185 A * | 2/1991 | Krishnan ................. 106/31.86 |
| 5,825,380 A | 10/1998 | Ichizawa et al. |
| 6,048,390 A * | 4/2000 | Yano et al. .............. 106/31.43 |
| 6,558,459 B2 * | 5/2003 | Schut ..................... 106/31.58 |
| 6,764,540 B2 * | 7/2004 | Taguchi .................. 106/31.27 |
| 6,783,819 B2 * | 8/2004 | Deardurff et al. ........ 428/32.36 |
| 7,288,144 B2 * | 10/2007 | Uozumi et al. ............ 106/31.6 |
| 2005/0223939 A1 * | 10/2005 | Uozumi et al. .......... 106/31.58 |
| 2006/0028519 A1 | 2/2006 | Nakamura et al. |
| 2007/0137519 A1 * | 6/2007 | Sugimoto et al. ........ 106/31.13 |
| 2007/0248838 A1 * | 10/2007 | De Saint-Romain ....... 106/31.6 |

FOREIGN PATENT DOCUMENTS

| | | |
|---|---|---|
| JP | S58-071170 A | 4/1983 |
| JP | H01-148557 A | 6/1989 |
| JP | H09-039260 A | 2/1997 |
| JP | 2006-027003 A | 2/2006 |

OTHER PUBLICATIONS

Derwent abstract of KR 2005048908, May 2005.*

* cited by examiner

*Primary Examiner*—Helene Klemanski
(74) *Attorney, Agent, or Firm*—Baker Botts L.L.P.

(57) ABSTRACT

A water-based ink for ink-jet recording contains water, a water-soluble organic solvent, a coloring agent and a crown ether. Even when the water-based ink is employed in the ink passage of an ink-jet recording apparatus and comes into contact with rubber members employed in the ink passage, the occurrence of precipitation is prevented.

20 Claims, No Drawings

WATER-BASED INK FOR INK-JET RECORDING

BACKGROUND OF THE INVENTION

1. Field of the Invention

The present invention relates to a water-based ink (hereinafter simply referred to as "ink") for ink-jet recording.

2. Description of the Related Art

In an ink-jet recording method, recording is performed by generating fine droplets of ink according to various ink ejection methods, causing them to fly, and allowing the ink to adhere to a recording material such as paper. In such a case, the ink droplets are generated by an ink ejection method such as: an electrostatic attraction method by means of the application of high voltage; a drop-on-demand method in which mechanical vibrations or displacements are applied to ink by use of a piezoelectric element; or a thermal method which utilizes the pressure generated when the ink is heated to generate a bubble. When using an ink-jet recording method, less noise is generated, and both high-speed printing and multi-color printing are possible.

Conventionally, a water-based ink containing water as the main solvent has been widely employed as an ink employed in such an ink-jet recording method.

In an ink-jet recording apparatus, rubber members are employed in an ink passage comprising an ink tank and an ink-jet head. These rubber members include: a cap which covers the nozzles of the ink-jet head; a wiper which cleans nozzle surfaces of the ink-jet head; a packing seal which is placed at the joint portion between components; a tube which supplies ink from the ink tank to the ink-jet head if the ink tank is provided separately from the ink-jet head; and the like.

However, when an ink for ink-jet recording comes in contact with the rubber members, additives contained in the rubber members are dissolved in the ink. The dissolved additives then precipitate out as insoluble materials, thereby causing problems such as clogging of nozzles of the ink-jet head.

In order to prevent the occurrence of precipitation in an ink, various proposals have been made, such as: adding a chelating agent to an ink; using a maintenance solution containing a chelating agent such as a polyaminocarboxylic acids and the like; and cleaning an ink-jet head with a cleaning solution containing a chelating agent such as ethylenediaminetetraacetic acids and the like.

However, even when the conventional ink, maintenance solution or cleaning solution, each of which contains an common chelating agent, is employed, it is difficult to effectively prevent the occurrence of precipitation caused by contact of the ink with the rubber members.

SUMMARY OF THE INVENTION

The present invention has been devised to solve the above problems. Accordingly, it is an object of the invention to prevent the occurrence of precipitation in an ink even when the ink comes in contact with rubber members in an ink passage of an ink-jet recording apparatus.

The present inventors have found that, in order to achieve the above object, it is effective to add a crown ether to an ink composition, and thus the present invention has been completed.

Accordingly, the present invention provides a water-based ink for ink-jet recording to be employed in an ink-jet recording apparatus in which rubber members are employed in an ink passage of an ink-jet head. The water-based ink for ink-jet recording is characterized by containing water, a water-soluble organic solvent, a coloring agent and a crown ether.

The present invention further provides an ink-jet recording apparatus comprising an ink-jet head in which a rubber member is employed in an ink passage thereof and a water-based ink for ink-jet recording is filled in the ink passage. And the ink-jet ink comprises water, a water-soluble organic solvent, a coloring agent and a crown ether.

The water-based ink for ink-jet recording of the present invention contains a crown ether. Therefore, even when the water-based ink comes into contact with rubber members in an ink passage of an ink-jet recording apparatus and causes additives to be dissolved from the rubber member into the ink, the dissolved materials may be stably maintained in their dissolved state.

Therefore, problems such as the clogging of the nozzles of an ink-jet head do not arise, and ejection stability of ink is improved.

DETAILED DESCRIPTION OF THE PREFERRED EMBODIMENTS

The present invention will be described in detail as below.

The water-based ink for ink-jet recording of the present invention contains water, a water-soluble organic solvent, a coloring agent and a crown ether. The crown ether is a characteristic component of the present invention and is added to the water-based ink for ink-jet recording in order to prevent the occurrence of precipitation caused by contact of the ink with the rubber members in an ink passage of an ink-jet recording apparatus.

The crown ether is a cyclic ether having repeating ethylene oxide ($-CH_2CH_2O-$) units, and various types of crown ethers having different ring sizes and different modified groups are known. In the present invention, crown ethers of groups 1 to 4 described below are preferably employed. When the ink comes into contact with rubber members, some components in the rubber members may be dissolved in the ink. For example, such components include: ions originating from a vulcanization agent or a vulcanization accelerator, such as zinc ions, iron ions, copper ions and sodium ions; and ions originating from a lubricant, such as calcium ions, zinc ions, magnesium ions and lead ions. The above-mentioned crown ethers are preferable, because they reliably trap such components and thereby prevent the components from precipitating out of ink. A detailed description of the crown ethers may be found in references such as: C. J. Pedersen, Journal of American Chemical Society, Vol. 86 (2495), 7017-7036 (1967); G. W. Gokel, S. H. Korzeniowski, "Macrocyclic polyether synthesis," Springer-Verlag. (1982); Oda, Shono and Tabuse (ed.), "Crown ether no kagaku (Chemistry of crown ether)," Kagaku Dojin (1978); Tabuse et al., "Host-Guest," Kyoritsu Shuppan (1979); and Sasaki and Koga, "Yuki Gosei Kagaku (Organic synthetic chemistry)," Vol. 45(6), 571-582 (1987).

Group 1:
12-Crown-4
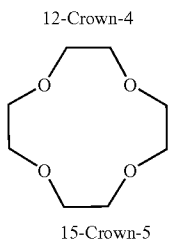
15-Crown-5
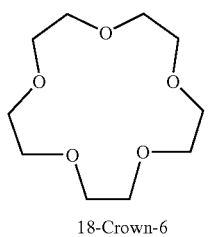
18-Crown-6
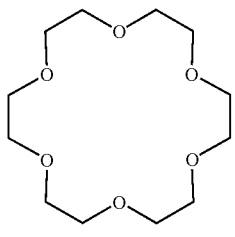
24-Crown-8
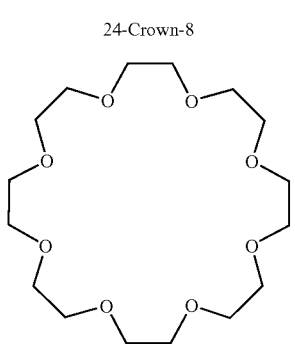
Group 2:
4′–Carboxybenzo-15-crown-5
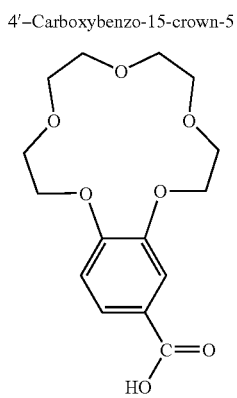
-continued
4′-Carboxybenzo-18-crown-6
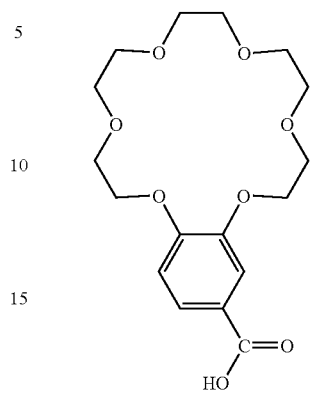
Group 3:
Dibenzo-15-crown-5
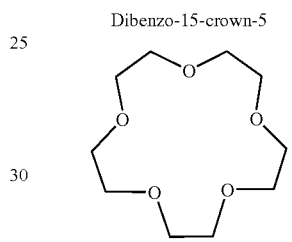
Dibenzo-21-crown-7
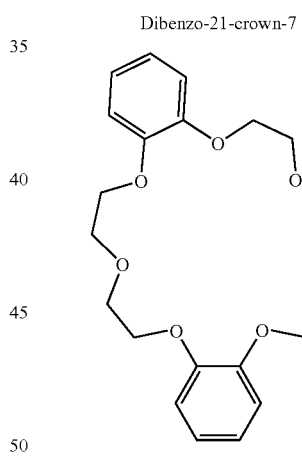
Dibenzo-24-crown-8
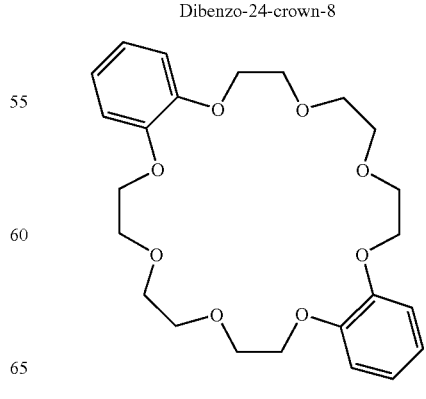

Group 4:

2-(Hydroxymethyl)-12-crown-4

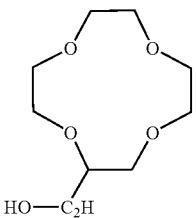

2-(Hydroxymethyl)-15-crown-5

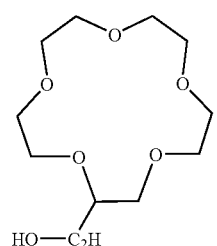

2-(Hydroxymethyl)-18-crown-6

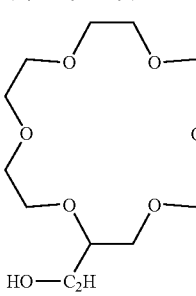

In the above examples, all heteroatoms constituting the crown ring are oxygen atoms. However, in the crown ethers employed in the present invention, the heteroatoms constituting the crown ring may include a nitrogen atom, a sulfur atom, a selenium atom and the like. These crown ethers may be employed alone or in a combination of two or more.

Among these crown ethers, a crown ether having a larger number of repeating ethylene oxide ($-CH_2CH_2O-$) units is preferable in terms of solubility. Furthermore, when the crown ethers have a substituent, the substituent is preferably a hydrophilic substituent. Preferred examples of the crown ether include, but not limited to, 18-crown-6,24-crown-8,4'-carboxybenzo-18-crown-6 and the like.

When the amount of the crown ether in the ink is too small, the effect of the addition of the crown ether is not satisfactory. When the amount is too large, the crown ether and other components constituting the water-based ink do not dissolve easily in each other. Therefore, the amount of the crown ether is preferably in the range of about 0.1 wt. % to about 10 wt. % and more preferably in the range of about 0.1 wt. % to about 5 wt. %.

Preferably, deionized water or pure water is employed as the water constituting the ink of the present invention. The preferred amount of water in the ink is appropriately determined according to the characteristics required for the ink. It is normally in the range of about 10 wt. % to about 95 wt. %.

Preferably, the water-soluble organic solvent constituting the ink of the present invention is employed as a penetrant or a humectant. The penetrant moderately enhances the penetration rate of ink into a recording material such as paper and improves the drying characteristics. The humectant prevents drying of ink in nozzles and improves the solution stability of the ink.

Preferably, a polyhydric alcohol alkyl ether which is capable of improving surface activity is employed as the penetrant. In contrast to a general surfactant such as polyoxyethylene nonylphenyl ether and the like, a mixture of the polyhydric alcohol alkyl ether and water has low foaming property and also has low surface tension. Therefore, the polyhydric alcohol alkyl ether effectively improves the wettability with the wall of the ink passage of an ink-jet head, whereby the ability to introduce the ink into the ink passage are improved.

Specific examples of the polyhydric alcohol alkyl ether include, but not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, triethylene glycol propyl ether, tripropylene glycol methyl ether, tripropylene glycol butyl ether and the like. These may be employed alone or as a mixture of two or more thereof.

Of these polyhydric alcohol alkyl ethers, a polyhydric alcohol alkyl ether having a vapor pressure at 20° C. of less than about 0.01 mmHg has low volatility and almost no specific odor of polyhydric alcohol alkyl ethers, and thus may be suitably employed. Examples of such a polyhydric alcohol alkyl ether include, but not limited to, triethylene glycol methyl ether, triethylene glycol butyl ether, tripropylene glycol butyl ether and the like.

Generally, the amount of the polyhydric alcohol alkyl ether in the ink is preferably in the range of about 0.1 wt. % to about 30 wt. %, more preferably in the range of about 0.1 wt. % to about 10 wt. %, and most preferably in the range of about 0.5 wt. % to about 7 wt. %. When the amount of the polyhydric alcohol alkyl ether in the ink is less than about 0.1 wt. %, the wettability with the wall of the ink passage of the ink-jet head is not sufficient, and thus the ability to introduce the ink are not sufficiently favorable. Further, when the amount thereof exceeds about 30 wt. %, the viscosity of the ink becomes high. Therefore, difficulty may arise in introducing the ink by means of a purging apparatus.

Examples of the humectant include, but not limited to, polyalkylene glycols such as polyethylene glycol; alkylene glycols such as ethylene glycol and the like, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, hexylene glycol and the like; glycerin; and pyrrolidones such as 2-pyrrolidone, N-methyl-2-pyrrolidone and the like. These may be employed alone or as a mixture of two or more thereof.

The amount of the humectant in the ink is preferably in the range of 0 wt. % to about 30 wt. %. Preferably, in order to provide favorable ability to introduce the ink into an ink passage, the total amount of the humectant and the penetrant with respect to the total amount of the ink is about 30 wt. % or less, thereby suppressing the viscosity rise in the ink.

The coloring agent constituting the ink of the present invention may use water-soluble dyes such as direct dyes, acid dyes, basic dyes, reactive dyes and the like; inorganic pigments; organic pigments. In addition to this, a self-dispersing type pigment which is obtained by subjecting a pigment to a surface treatment may be employed.

Generally employed additives such as a surfactant, a dispersing agent, a viscosity modifier, a surface tension modifier, a pH modifier and a preservative-mildewproofing agent may be added to the ink of the present invention in accordance with need. In particular, a polyoxyethylene alkyl ether sulfate-based surfactant represented by the following formula is preferably added as the surfactant, for suppressing the foaming property of the ink, moderately enhancing the wettability of the ink, and improving the ability to introduce the ink:

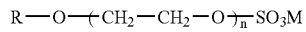

wherein R is a linear or branched alkyl group having 12 to 15 carbon atoms, M is Na or triethanolamine, and n is 2 to 4. Examples of the commercially available product of the above surfactant include, but not limited to: SUNNOL® NL-1430, LMT-1430 and DM-1470 (products of Lion Corporation); EMAL® 20C, 20CM and 20T (products of Kao Corporation); SANDET® EN, ET and END (products of Sanyo Chemical Industries, Ltd.); and the like.

The ink of the present invention may be obtained by mixing the above-mentioned components under stirring by means of conventional methods known to the skilled person.

Furthermore, the ink of the present invention may be employed in a known ink-jet recording apparatus, and no limitation is imposed on the ink ejection method. The ink may be employed in an ink-jet recording apparatus employing a thermal method, a piezo method or any other methods.

However, the ink of the present invention is characterized in that the state of the solution is stably maintained even when a component originating from a rubber member is dissolved therein upon contact with the rubber member. Therefore, the ink is valuable for use in an ink-jet recording apparatus in which a rubber member is employed in at least a part of the ink passage thereof.

In an ink-jet recording apparatus, rubber members employed in a part of the ink passage include: a cap which covers the nozzles of the ink-jet head; a wiper which cleans nozzles surfaces of the ink-jet head; a tube which supplies ink from an ink tank to the ink-jet head if the ink tank is provided separately from the ink-jet head; a packing seal which is an elastic member held between a buffer tank and a head unit, as disclosed in Japanese Patent Application Laid-Open No. 2006-27003; and the like. Generally, ethylene propylene diene rubber polymer (EPDM), isobutylene-isoprene rubber polymer (IIR), isoprene rubber polymer (IR), butadiene rubber polymer (BR), silicone rubber polymer (Q), chloroprene rubber polymer (CR) or the like is employed as the base polymer of these rubber members.

However, when a rubber member is formed of ethylene propylene diene rubber polymer (EPDM), as represented by the formula below, the ink of the present invention exhibits a significantly high stability in the solution state upon contact with the rubber member. Therefore, the ink of the present invention may be particularly preferably employed in an ink-jet recording apparatus in which rubber members of an ink passage are formed of the ethylene propylene diene rubber polymer:

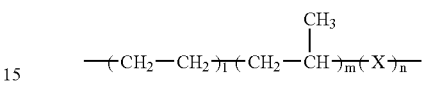

wherein X represents a non-conjugated diene compound such as ethylidene norbornene, dicyclopentadiene or 1,4-hexadiene.

A commercial product may be employed as the ethylene propylene diene rubber polymer (EPDM). Examples of the commercial ethylene propylene diene rubber polymer include, but not limited to, EP331 (product of JSR Corporation), ESPRENE® 505 (product of SUMITOMO CHEMICAL CO., Ltd.) and the like.

The present invention also embraces as another mode an ink-jet recording apparatus comprising an ink-jet head, as above-mentioned. The ink-jet head employs a rubber member in an ink passage thereof and a water-based ink for ink-jet recording is filled in the ink passage. The water-based ink comprises water, a water-soluble organic solvent and a crown ether.

EXAMPLES

The present invention will next be specifically described by way of examples, but the invention is not limited to these examples.

Examples 1 to 6 and Comparative Examples 1 and 2

(1) Preparation of Inks

The inks of Examples 1 to 6 and Comparative Examples 1 and 2 were prepared with compositions shown in Table 1. Each of the inks was prepared by mixing all of the components under sufficient stirring, followed by filtration through a membrane filter of 0.8 µm.

TABLE 1

| | | Ink | | | | | | | |
|---|---|---|---|---|---|---|---|---|---|
| | | Ex. 1 | Ex. 2 | Ex. 3 | Ex. 4 | Ex. 5 | Ex. 6 | Comp. Ex. 1 | Comp. Ex. 2 |
| Ink composition (wt. %) | Water | 42.1 | 37.8 | 68.2 | 67.9 | 67.3 | 65.0 | 68.2 | 73.0 |
| | Glycerin | 24.0 | 24.0 | 24.0 | 24.0 | 24.0 | 24.0 | 24.0 | 24.0 |
| | Triethylene glycol-n-butyl ether | 3.0 | 3.0 | — | 3.0 | 5.0 | — | 5.0 | — |
| | Dipropylene glycol-n-propyl ether | — | — | 1.5 | 0.9 | — | 0.9 | — | — |

TABLE 1-continued

|  |  | Ink |  |  |  |  |  |  |  |
|---|---|---|---|---|---|---|---|---|---|
|  |  | Ex. 1 | Ex. 2 | Ex. 3 | Ex. 4 | Ex. 5 | Ex. 6 | Comp. Ex. 1 | Comp. Ex. 2 |
|  | Tripropylene glycol-n-butyl ether | 0.5 | 0.5 | 0.5 | — | — | — | — | — |
|  | CAB-O-JET ® *1 | 30.0 | 30.0 | — | — | — | — | — | — |
|  | C.I. Direct Yellow 86 | — | — | 2.5 | — | — | — | 2.5 | — |
|  | C.I. Acid Red 52 | — | — | — | 3.0 | — | — | — | — |
|  | C.I. Direct Blue 199 | — | — | — | — | 3.0 | 3.0 | — | 3.0 |
|  | 18-Crown-6 | 0.2 | 4.5 | — | — | — | 2.0 | — | — |
|  | 24-Crown-8 | — | — | 3.0 | — | — | — | — | — |
|  | 4'-Carboxybenzo-18-crown-6 | — | — | — | 1.0 | — | — | — | — |
|  | Dibenzo-21-crown-7 | — | — | — | — | 0.5 | — | — | — |
|  | 2-(Hydroxymethyl)-15-crown-5 | — | — | — | — | — | 4.8 | — | — |
|  | SUNNOL ® NL1430 *2 | 0.2 | 0.2 | 0.3 | 0.2 | 0.2 | 0.3 | 0.3 | — |
| Evaluation | Evaluation of the ability to introduce ink | B | B | A | B | A | A | A | C |
| Evaluation rubber precipitation | Rubber sheet 1 | B | A | A | A | B | A | D | D |
|  | Rubber sheet 2 | A | A | A | A | A | A | D | D |

*1: Solid concentration of coloring agent: 15 wt. %
*2: Polyoxyethylene alkyl ether sulfate-based surfactant; product of Lion Corporation (2) Evaluation (2-1) Evaluation of the Ability to Introduce Ink Each of the inks was filled into ink cartridges intended for use in a digital multifunction device equipped with an ink-jet printer (MFC-5200J, product of Brother Industries, Ltd.), and the cartridges were inserted into the digital multifunction device. Subsequently, a maintenance operation was carried out for removing bubbles generated in an ink passage. Immediately after completion of the maintenance operation, the ratio of the number of nozzles having ejection failure to the total number of nozzles was determined at the initial ejection of each of the inks. The ratio was evaluated according to the following criteria. The results are shown in Table 1.

Criteria for the evaluation of the ability to introduce ink:

A: The ratio of the number of the ink ejectable nozzles at the initial ejection is 95% or more.

B: The ratio of the number of the ink ejectable nozzles at the initial ejection is 90% or more and less than 95%.

C: The ratio of the number of the ink ejectable nozzles at the initial ejection is less than 90%.

(2-2) Evaluation of Precipitation of Rubber

According to each of the rubber compositions shown in Table 2, all the materials were successively fed to a rubber mixer, kneaded, and then discharged therefrom. Each of the discharged mixtures was extruded into a sheet-like shape by means of a biaxial extruder and was then subjected to vulcanization molding (at 165° C. for 7 minutes), thereby obtaining a rubber sheet 1 (butyl rubber (IIR)) and a rubber sheet 2 (ethylene propylene diene rubber (EPDM)).

TABLE 2

|  |  | (Unit: Parts by weight) | |
|---|---|---|---|
|  |  | Rubber sheet 1 | Rubber sheet 2 |
| Polymer | Ethylene propylene diene rubber polymer *1 | — | 100 |
|  | Isoprene-isobutylene rubber polymer *2 | 100 | — |
| Vulcanization agent | Zinc oxide | 5 | 5 |
|  | Dicumyl peroxide | — | 2.7 |
| Vulcanization accelerator | Tetramethylthiuram disulfide | 1.5 | — |
| Filler | Carbon black | 50 | 100 |
| Softening agent | Paraffin oil | — | 50 |
| Processing aid | Stearic acid | 1 | 1 |

*1: EP331, product of JSR Corporation
*2: HT-1066, product of JSR Corporation

Each of the obtained rubber sheets 1 and 2 was cut into dimensions of 50 mm length, 10 mm width and 2 mm thickness. One of the cut rubber sheets was immersed in 10 mL of the ink in a sealed container and was left to stand for two weeks in a thermostatic bath at 60° C. Subsequently, the immersed rubber sheet was removed, and the ink, after the removal of the immersed rubber sheet, was filtrated with an electroformed filter (having a pore size of 13 μm and an effective filtration area of 8 cm²) to measure the time required for the filtration. In addition, as a control, the inks in which the rubber sheet was not added were left to stand under the same conditions as above (at 60° C. for two weeks) and were filtrated with an electroformed filter having the same specification as above to determine the time required for the filtration (this provided a reference time). For each of the inks into which the rubber sheet was immersed, the percentage of the time required for the filtration to the reference time was determined and evaluated according to the following criteria. The results are shown in Table 1.

Criteria for the evaluation of precipitation of rubber:

A: The required filtration time is less than 130% of the reference time.

B: The required filtration time is at least 130% and less than 200% of the reference time.

C: The required filtration time is at least 200% and less than 400% of the reference time.

D: The required filtration time is at least 400% of the reference time.

The electroformed filters after the filtration were observed under a microscope, and it was found that the larger the ratio of the above-mentioned filtration time to the reference time, the higher the amount of precipitations.

As shown in Table 1, in the inks of Examples 1 to 6 containing the crown ether, the evaluation results of the precipitation of rubber were excellent for each of the rubber sheet 1 (IIR) and the rubber sheet 2 (EPDM). In particular, the evaluation results of precipitation were excellent for the rubber sheet 2.

On the other hand, in the inks of Comparative Examples 1 and 2 not containing the crown ether, the evaluation results of the precipitation of rubber were poor. In particular, in the ink of Comparative Example 2, which does not even contain the polyoxyethylene alkyl ether sulfate-based surfactant, the evaluation results of the ability to introduce ink were also poor.

The present invention may provide a useful ink employed in an ink-jet recording apparatus having a rubber member in an ink passage.

The entire disclosure of the specification, summary and claims of Japanese Patent Application No. 2005-362466 filed Dec. 15, 2005 is hereby incorporated by reference.

What is claimed is:

1. A water-based ink for ink-jet recording to be employed in an ink-jet recording apparatus in which a rubber member is employed in an ink passage of an ink-jet head, wherein the water-based ink comprises water, a water-soluble organic solvent, a coloring agent and a free crown ether, wherein the concentration of the free crown ether is from about 0.1 wt. % to about 5 wt. %.

2. The water-based ink according to claim 1, wherein a crown ring of the free crown ether includes a nitrogen atom, a sulfur atom or a selenium atom.

3. The water-based ink according to claim 1, wherein the free crown ether is at least one selected from the group consisting of 12-crown-4, 15-crown-5, 18-crown-6, 24-crown-8, 4'-carboxybenzo-15-crown-5, 4'-carboxybenzo-18-crown-6, dibenzo-15-crown-5, dibenzo-21-crown-7, dibenzo-24-crown-8, 2-(hydroxymethyl)-12-crown-4, 2-(hydroxymethyl)-15-crown-5, and 2-(hydroxymethyl)-18-crown-6.

4. The water-based ink according to claim 1, wherein the free crown ether is at least one selected from the group consisting of 18-crown-6, 24-crown-8 and 4'-carboxybenzo-18-crown-6.

5. The water-based ink according to claim 1, further comprising a trapped-ion crown ether comprising a trapped ion selected from the group consisting of a zinc ion, an iron ion, a copper ion, a sodium ion, a calcium ion, a magnesium ion, a lead ion, and combinations thereof.

6. The water-based ink according to claim 1, wherein the water-soluble organic solvent comprises polyhydric alcohol alkyl ether.

7. The water-based ink according to claim 6, wherein the polyhydric alcohol alkyl ether is at least one selected from the group consisting of diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, triethylene glycol propyl ether, tripropylene glycol methyl ether and tripropylene glycol butyl ether.

8. The water-based ink according to claim 6, wherein the polyhydric alcohol alkyl ether has a vapor pressure at 20° C. of less than about 0.01 mmHg.

9. The water-based ink according to claim 6, wherein the polyhydric alcohol alkyl ether is at least one selected from the group consisting of triethylene glycol methyl ether, triethylene glycol butyl ether and tripropylene glycol butyl ether.

10. The water-based ink according to claim 6, wherein the amount of the polyhydric alcohol alkyl ether in the water-based ink is in the range of about 0.1 wt. % to about 10 wt. %.

11. The water-based ink according to claim 6, wherein the amount of the polyhydric alcohol alkyl ether in the water-based ink is in the range of about 0.5 wt. % to about 7 wt. %.

12. The water-based ink according to claim 1, further comprising a polyoxyethylene alkyl ether sulfate-based surfactant represented by the following formula:

wherein R is an alkyl group having 12 to 15 carbon atoms, M is Na or triethanolamine, and n is 2 to 4.

13. The water-based ink for ink-jet recording according to claim 1, wherein the rubber member employed in a part of the ink passage of the ink-jet head comprises ethylene propylene diene rubber polymer.

14. An ink-jet recording apparatus comprising an ink-jet head in which a rubber member is employed in an ink passage thereof and a water-based ink for ink-jet recording is filled in the ink passage, wherein the ink-jet ink comprises water, a water-soluble organic solvent, a coloring agent and a free crown ether, wherein the concentration of the free crown ether is from about 0.1 wt. % to about 5 wt. %.

15. The water-based ink according to claim 1 further comprising a trapped-ion crown ether comprising a trapped ion selected from the group consisting of an ion originating from a vulcanization agent, an ion originating from a lubricant, an ion originating from a vulcanization accelerator, and combinations thereof.

16. The water-based ink according to claim 15, wherein the trapped ion is an ion originating from a vulcanization agent selected from the group consisting of a zinc ion, an iron ion, a copper ion, a sodium ion, and combinations thereof.

17. The water-based ink according to claim 15, wherein the trapped ion is an ion originating from a lubricant selected from the group consisting of a zinc ion, a calcium ion, a magnesium ion, a lead ion, and combinations thereof.

18. A water-based ink for ink-jet recording to be employed in an ink-jet recording apparatus in which a rubber member is employed in an ink passage of an ink-jet head, wherein the water-based ink comprises water, a water-soluble organic solvent, a coloring agent, a free crown ether, and a trapped-ion crown ether, wherein the trapped-ion crown ether comprises a trapped ion selected from the group consisting of an ion originating from a vulcanization agent, an ion originating from a lubricant, an ion originating from a vulcanization accelerator, and combinations thereof.

19. The water-based ink according to claim 18, wherein the trapped ion is an ion originating from a vulcanization agent selected from the group consisting of a zinc ion, an iron ion, a copper ion, a sodium ion, and combinations thereof.

20. The water-based ink according to claim 18, wherein the trapped ion is an ion originating from a lubricant selected from the group consisting of a zinc ion, a calcium ion, a magnesium ion, a lead ion, and combinations thereof.

* * * * *